United States Patent
Kong et al.

(10) Patent No.: US 7,173,359 B2
(45) Date of Patent: Feb. 6, 2007

(54) BRUSH HOLDER ASSEMBLY FOR AN ELECTRIC MOTOR

(75) Inventors: Johnny Ho Yin Kong, Hong Kong (HK); Virgilio Crestani, Hong Kong (HK)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 11/002,227

(22) Filed: Dec. 3, 2004

(65) Prior Publication Data

US 2005/0121994 A1 Jun. 9, 2005

(30) Foreign Application Priority Data

Dec. 6, 2003 (GB) .................................. 0328386.8

(51) Int. Cl.
*H01R 39/38* (2006.01)
*H02K 13/00* (2006.01)

(52) U.S. Cl. ....................................... 310/239; 310/242
(58) Field of Classification Search ........ 310/239–247, 310/249
See application file for complete search history.

(56) References Cited

U.S. PATENT DOCUMENTS

| | | | | |
|---|---|---|---|---|
| 931,415 A | * | 8/1909 | Grant ........................... 310/244 |
| 1,935,789 A | * | 11/1933 | Cullin .......................... 310/239 |
| 2,584,214 A | * | 2/1952 | Luther et al. ................ 310/247 |
| 3,112,419 A | * | 11/1963 | Dobslaw ...................... 310/239 |
| 3,329,844 A | * | 7/1967 | Happe ......................... 310/239 |
| 3,450,917 A | * | 6/1969 | Zelik ........................... 310/247 |
| 3,474,274 A | * | 10/1969 | Groschopp .................. 310/242 |
| 3,526,797 A | * | 9/1970 | Jueschke ..................... 310/245 |
| 3,579,007 A | * | 5/1971 | Walter ......................... 310/242 |
| 3,656,018 A | * | 4/1972 | Maher ......................... 310/242 |
| 3,710,160 A | * | 1/1973 | Voglesonger ................ 310/247 |
| 3,842,302 A | * | 10/1974 | Apostoleris ................. 310/239 |
| 4,110,651 A | * | 8/1978 | Fagan ......................... 310/239 |
| 4,625,136 A | * | 11/1986 | Kipke ......................... 310/239 |
| 5,153,474 A | * | 10/1992 | Wong et al. ................ 310/245 |
| 5,235,230 A | * | 8/1993 | Yuhi et al. .................... 310/71 |
| 5,343,102 A | * | 8/1994 | Mabuchi et al. .............. 310/71 |
| 5,481,150 A | * | 1/1996 | Tanaka et al. ............... 310/249 |
| 5,631,513 A | | 5/1997 | Coles et al. |
| 5,939,812 A | * | 8/1999 | Wetzel ........................ 310/245 |
| 6,608,432 B2 | * | 8/2003 | Weaver et al. .......... 313/231.41 |
| 6,794,787 B2 | * | 9/2004 | Girt ............................. 310/238 |

FOREIGN PATENT DOCUMENTS

| | | |
|---|---|---|
| GB | 2 352 881 A | 2/2001 |
| GB | 2 367 193 A | 3/2002 |

* cited by examiner

*Primary Examiner*—Darren Schuberg
*Assistant Examiner*—Erik Preston
(74) *Attorney, Agent, or Firm*—Birch, Stewart, Kolasch & Birch, LLP

(57) ABSTRACT

A universal motor has a brush cage assembly in which a U-shaped clip 34 is located about a wall of a through hole 28 of a bearing bracket 24 for receiving a brush cage 30. The clip 34 has an outer limb 42 with inwardly and rearwardly directed barbs 44 to grip an outer surface of the wall to prevent removal of the clip 34 and an inner limb 36 with outwardly and forwardly directed barbs 42 which resiliently deform as the cage 30 is inserted to snare the cage 30 should it move in the opposite direction. The clip 34 thus prevents withdrawal of the brush cage 30 and provides a lateral spring force against the cage 30 to reduce cage lateral position tolerance and movement.

17 Claims, 4 Drawing Sheets

BRUSH HOLDER ASSEMBLY FOR AN ELECTRIC MOTOR

CROSS-REFERENCE TO RELATED APPLICATIONS

This non-provisional patent application claims priority under 35 U.S.C. § 119(a) from patent application Ser. No. 0328386.8 filed in Great Britain on Dec. 6, 2003.

FIELD OF THE INVENTION

This invention relates to electric motors and in particular, to a brush holder assembly for a small electric motor.

BACKGROUND OF THE INVENTION

Many small brush type electric motors, such as fractional horsepower universal type motors and miniature dc motors have brush cages for guiding brushes into contact with a commutator. It is common for the brush cages to be essentially brass tubes in which the brushes slide under the influence of a brush spring. The brush tubes are fixed to the motor structure to ensure accurate location of the position of contact between the brush and the commutator. Often the motor structure includes a bearing bracket of plastic or similar insulating material and the brass tubes are pressed into holes in the bearing bracket. Alternatively, when the bearing bracket is electrically conductive, an insulated bushing is used to fix the brass tube to the bearing bracket.

The brush tube requires means for fixing it within the hole in the insulator. This is usually in the form of a step which prevents the tube from being pressed in further and a raised finger which is resiliently deformed as the tube is being pressed in but snaps into a recess as the tube is fully inserted to prevent withdrawal.

The brass tube is a precision assembly. If the tube's internal dimensions are too small, the brush will not slide and if it is too big, the brush will wobble within the tube causing sparking on the commutator leading to rapid wear of both brush and commutator. Also, the hole in the insulator must be tightly controlled so that the tube will be held snugly but not so tightly to deform the tube and catch the brush. Another disadvantage is that the snap finger is not very resilient and often does not rebound enough to adequately hold the tube in place. To overcome this problem, the recess for the finger is made bigger to ensure clearance between the finger and the edge of the recess but this allows axial movement of the brush tube which also leads to sparking under vibration.

While some motors do not use a brass brush cage but allow the brush to slide directly in the through hole of the bearing bracket, this is not acceptable for high speed and high power motors where positioning and heat dissipation are critical issues.

SUMMARY OF THE INVENTION

The present invention overcomes these problems by providing a separate clip which grips both the insulator and the brush cage to prevent withdrawal of the brush cage.

Accordingly, the present invention provides a commutator motor, including a stator, wound rotor, bearing bracket and at least two sets of brush gear, wherein each brush gear comprises a brush, a brush cage and a brush spring, the brush cage being fitted to a radial through hole in the bearing bracket for directing the brush towards the commutator characterized by a cage clip having a first set of barbs which engage and grip a wall of the through hole to prevent withdrawal of the clip from the through hole once inserted and a second set of barbs which engage and grip an outer surface of the brush cage to prevent withdrawal of the brush cage from the through hole.

Preferably, brush cage resiliently deforms the second set of barbs on insertion thereby ensuring good contact between the second set of barbs and the cage.

Preferably, the resilient deformation results in a lateral pretension on the cage reducing the lateral play between the cage and the through hole.

Preferably, the clip is U-shaped and straddles a wall of the through hole.

Preferably, clip has an outer limb bearing the first set of barbs and an inner limb bearing the second set of barbs.

Preferably, the outer limb is shorter than the inner limb and has an outwardly curved distal end.

Preferably, the first set of barbs is inwardly and rearwardly directed.

Preferably, the second set of barbs is outwardly and forwardly directed.

Preferably, at least some of the barbs are cut and raised projections.

Preferably, the clip is of a resilient conducting material.

Preferably, the material is stainless steel.

Preferably, the bearing bracket is of a molded insulating material.

Alternatively, the bearing bracket is a U-shaped stamped metal part having an insulator of molding insulating material fitted to each leg, each insulator forming the through hole for receiving a respective brush cage.

The present invention also provides a method of assembling a commutator motor having a stator, bearing bracket, a wound rotor and two sets of cage brush assemblies, the method including the steps of: fitting the rotor to the stator and bearing bracket and fitting the brush assemblies to a respective through hole in one of the bearing brackets, said fitting of the brush assemblies including the steps of: providing a cage clip having a first set of barbs and a second set of barbs, inserting the cage clip into the through hole so as to engage the first set of barbs with a wall of the through hole and to avoid engaging the second set of barbs with the wall of the through hole, inserting a brush cage into the through hole so as to resiliently deform the second set of barbs on insertion and to engage the second set of barbs on movement of the cage in the opposite direction, inserting a brush into the cage, inserting a brush spring into the cage to urge the brush into contact with the commutator and capturing the spring to remain in resilient contact with the brush.

Preferably, the clip is U-shaped and is pressed into the through hole so as to straddle the wall and is pressed in until a base of the U contacts the wall.

Preferably, the cage is provided with an external stopper and the cage is pressed into the through hole until the stopper contacts the bearing bracket.

Preferably, the method includes the step of using the resiliency of the deformed second set to barbs to provide a lateral pretension on the brush cage to reduce lateral play of the cage within the through hole.

BRIEF DESCRIPTION OF THE DRAWINGS

Preferred embodiments of the invention will now be described, by way of example only, with reference to the accompanying drawings in which.

DETAILED DESCRIPTION OF THE PREFERRED EMBODIMENTS

Figure 1:
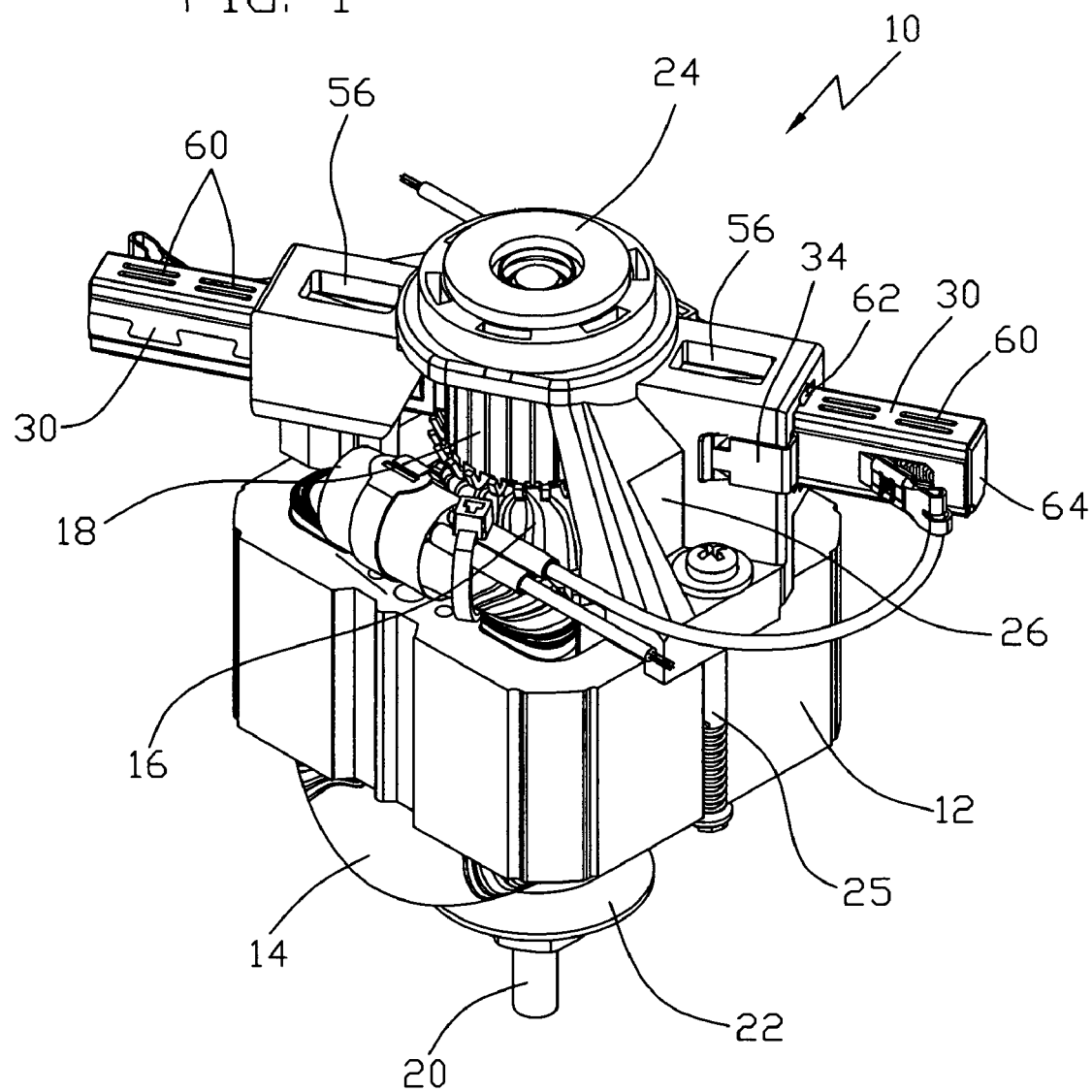
FIG. 1 depicts a universal motor incorporating a brush assembly according to the present invention.

The present invention will be illustrated by describing a preferred embodiment of the brush assembly as used in a universal motor as shown in FIG. 1. The universal motor 10 has a laminated stator core 12 supporting stator windings 14. A wound rotor 16, including a commutator 18 and a shaft 20 is located extending through the stator core 12. An output bearing bracket 22 is fixed to one axial end of the stator core. An input bearing bracket 24 is fixed to the other axial end of the stator core 12. The bearing brackets 22, 24 are fixed to the stator core 12 by bolts 25 which extend through holes in the brackets 22, 24 and through or along side the stator core 12. Both brackets 22, 24 support bearings in which the shaft 20 is journalled. The output bracket 22 is U-shaped and may include additional holes for mounting of the motor to an appliance. The input bracket 24 is also U-shaped and the commutator is located between the legs 26 of the input bracket. Each leg of the input bracket also has a radial hole 28 formed therethrough. Brush cages 30 are accommodated in the holes 28 for guiding carbon brushes 32 located within the cages into contact with the commutator 18.

Figure 2:
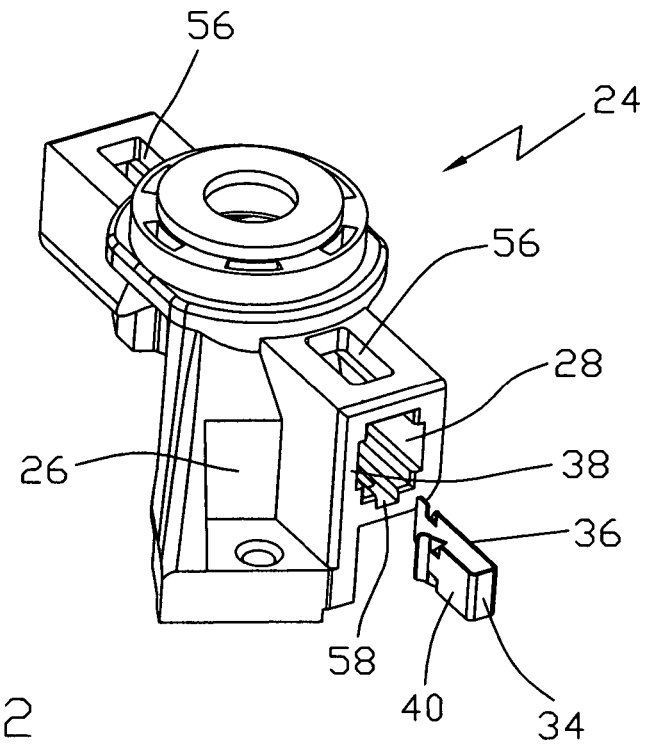
FIGS. 2, 3 and 4 are detailed views of the brush assembly of the motor of FIG. 1 in various stages of assembly.
Figure 3:
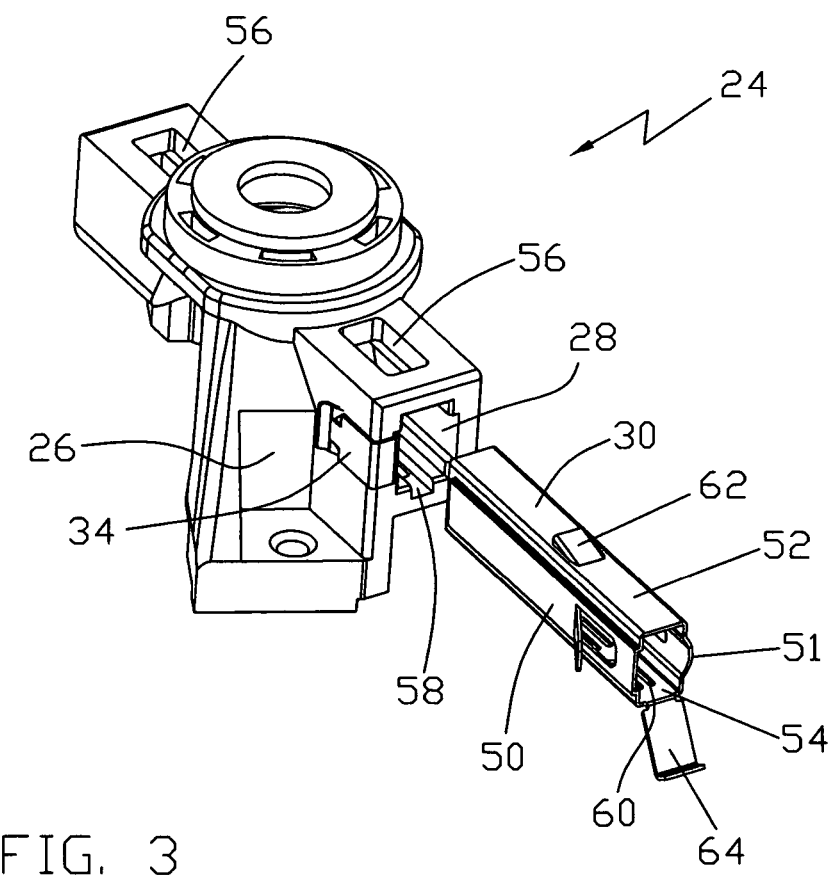
Figure 4:
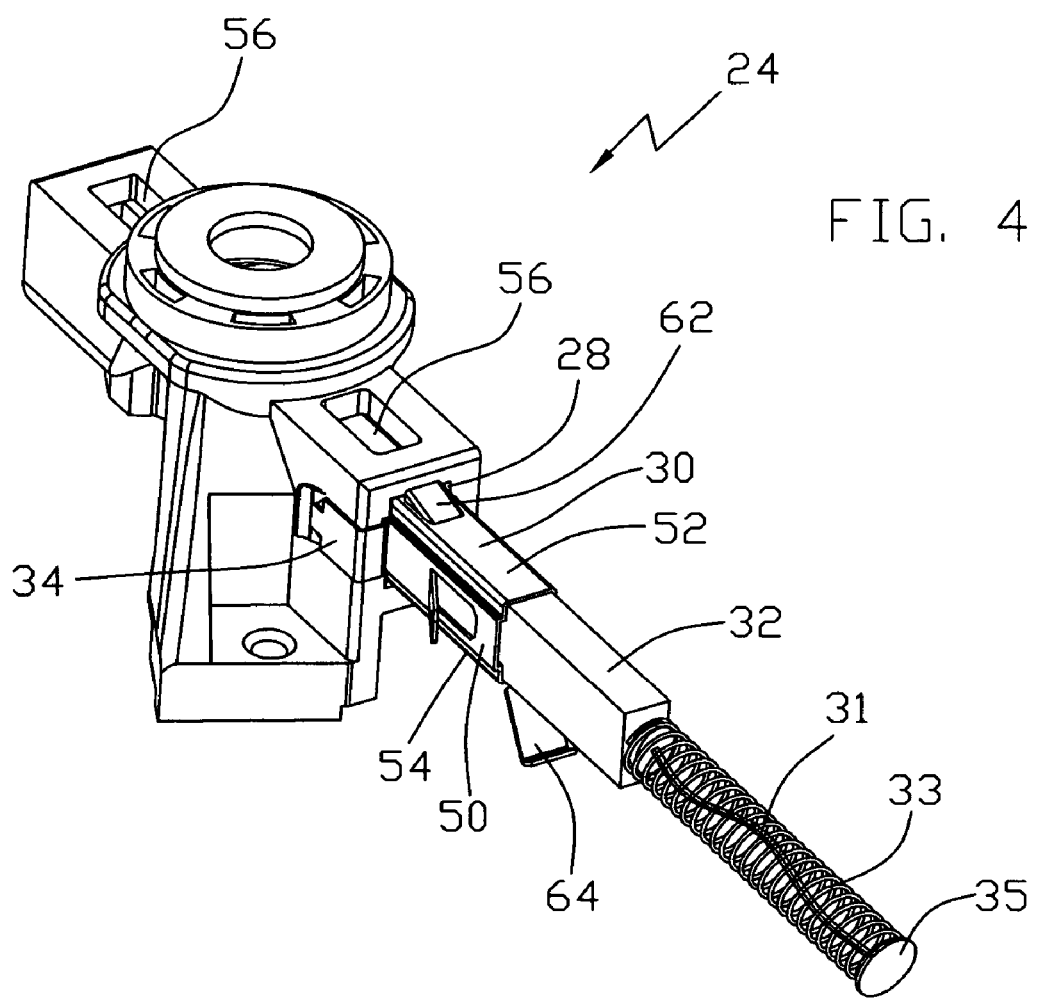

Assembly of the brush assembly will described with reference to FIGS. 2, 3 and 4. The input bracket 24 is a molded resin article of a suitable engineering insulating plastics material such as "BMC". The through hole 28 has a stepped profile as is common.

A U-shaped clip 34 is placed over a lateral edge or wall 38 of the hole 28 such that one leg 36 of the clip extends along an inner surface of the wall 38 and the other leg 40 of the clip extends along an outer or second surface of the wall 38. Thus, the wall 38 is straddled and gripped by the clip 34.

Once the clip 34 is in place, the brush cage 30 is pressed into the through hole 28. The brush cage 30 is a tube formed from brass sheet. The tube has a basic rectangular cross-section, to match the cross section of an associated brush, with the longer or major sides 50, 51 being stepped or curved to accommodate a brush spring 33 (FIG. 4). Thus the brush 32 is guided only by the edges of the long sides 50, 51. The through hole 28 is similarly stepped to hold the brush cage 30 only by the edges of the long sides 50, 51. The short top side 52 of the brush cage is flat and the through hole 28 has a similar dimension except that the through hole may have an opening 56 along the middle of the top side to aid cooling of the brush and cage. The short bottom side 54 of the cage is flat but the bottom side of the through hole 28 is stepped to provide a clearance or passage way 58 along the middle of the bottom side for air flow to cool the brush 32 and cage 30. The cage 30 may have ventilation openings 60 (FIGS. 1, 3) along the top and bottom sides 52, 54 to aid cooling of the brush. Thus the cage is held in the through hole essentially by the corners of the through hole 28. This is advantageous as the molding process tolerances can be relaxed to allow warpage of the faces of the through hole 28 whereas the corners, being better supported by surrounding material is less likely to warp and is easier to control.

A raised finger 62 on the brush cage 30, shown here being raised from the top side 52, prevents the cage 30 from being pressed too far into the through hole 28. Thus the cage is pressed in until the finger 62 bears against the input bracket 24. Removal of the brush cage 30 from the through hole is prevented by the clip 34 as will be described hereinafter. Once the brush cage has been installed, a brush 32 is inserted into the cage followed by a brush spring 33. A flap 64 at the distal end of the cage 30 is then bent to close the end of the cage preventing removal of the spring and brush and providing a seat for the spring to bear against as it urges the brush towards the commutator. As shown in FIG. 4, brush 32 may have an embedded shunt wire 31 which may pass through the spring 33 and terminate on a terminal 35 which prevents separation of the spring 33 so that the brush 12 and spring 33 is installed as a single unit with the shunt providing the electrical connection to the brush 33 via the terminal 35.

Figure 5:
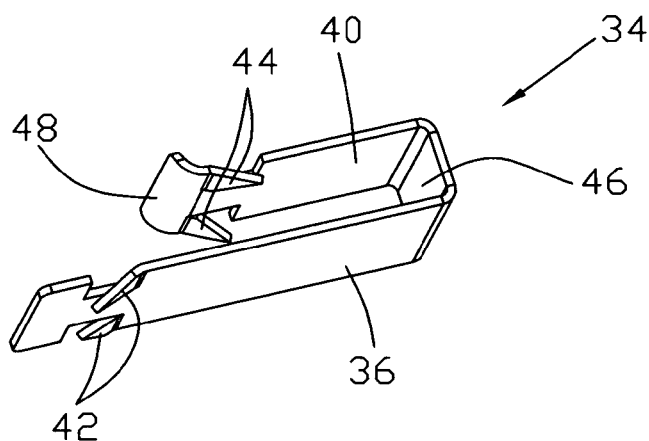
FIG. 5 is a perspective view of a clip forming a part of the brush assembly.

The clip 34 is shown more clearly in FIG. 5. The long leg 36 of the clip has barbs 42 formed at its distal end region. Barbs 42 are outwardly and forwardly directed to avoid contact with the wall 38 of the through hole. The shorter leg 40 of the clip has an outwardly curved distal end 48 to aid insertion of the clip. The distal end region also has barbs 44. Barbs 44 are inwardly and rearwardly directed. The barbs 44 make contact with the outer surface of wall 38 of the through hole. The barbs allow the clip to be installed but attempts to remove the clip cause barbs 44 to bite into the wall 38 to inhibit movement. The clip 34 is pressed into the wall 38 until the base 46 of the U-shaped clip contacts the wall preventing further insertion.

Figure 6:
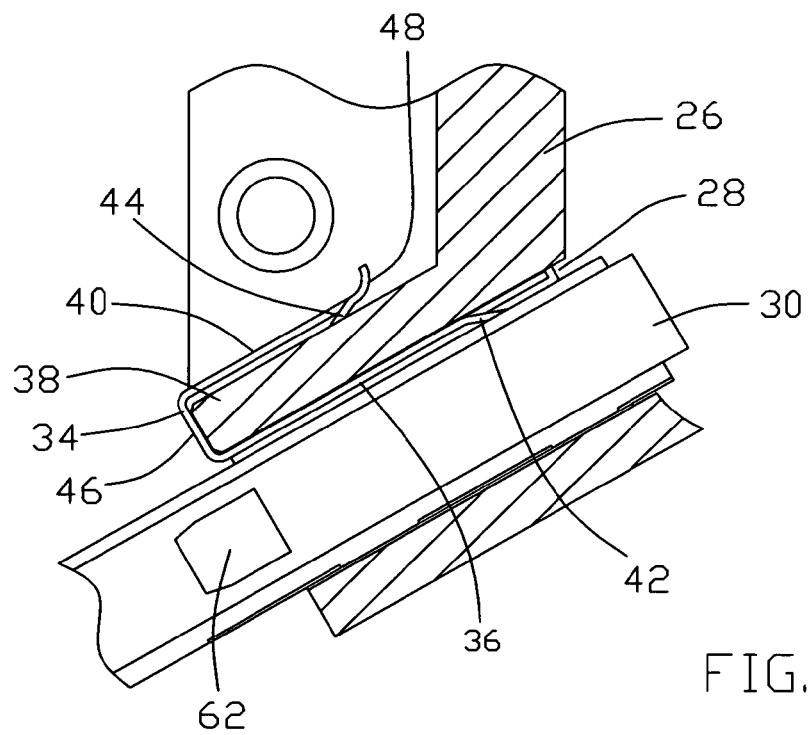
FIG. 6 is a detailed sectional schematic showing the function of the clip of FIG. 5.

The barbs 42 are arranged to contact an outer surface of the brush cage 30, as shown in FIG. 6. The forward facing barbs 42 allow the cage to be pressed passed the clip 34 but movement of the cage in the opposite direction causes the barbs 42 to grip or snare the cage 30 resisting removal of the cage 34.

The clip is made of stainless steel for hardness of the barbs to bite into the wall and cage and resilience to allow the barbs to bend or flex during insertion. This resilient deformation of the barbs 42 has a second advantage. The barbs 42 provide a spring force urging the brush cage sideways. This lateral force ensures that the other long side 51 of the cage is firmly seated against the through hole contacts reducing any lateral play in brush cage position and thus reducing the total play in brush contact position on the commutator while allowing easy insertion of the brush cage 30.

Thus, the use of a simple, double barbed brush cage clip 34, according to the present invention, provides an improved brush cage assembly with easy assembly and manufacturability.

In an alternate construction, not illustrated, the input bracket is a stamped metal part and an insulator of molded insulating material and having a hole for receiving a brush cage is fitted to each leg of the input bracket.

Figure 7:
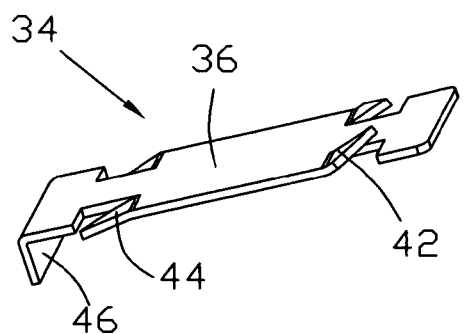
FIG. 7 is a perspective view of an alternative clip.
Figure 8:
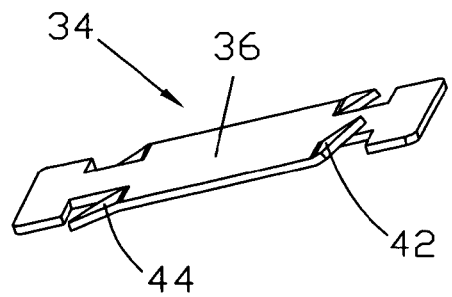
FIG. 8 is a perspective view of a further alternative clip.

The embodiment described above is given by way of example only and various modifications will be apparent to persons skilled in the art without departing from the scope of the invention as defined in the appended claims. For example, the clip could be L-shaped as shown in FIG. 7 or straight as shown in FIG. 8 with forward and reverse barbs on opposite sides to bind the cage to the inner wall of the through hole without the need to straddle the wall. The L-shaped clip provides a convenient stop to precisely position the clip within the hole for the brush cage.

The straight and L-shaped clips provide excellent holding of the brush cage and an be used when the wall thickness of the brush cage holder is large. However, the U-shaped clip is preferred due to the possibility of removing the clip and brush cage, if desired, by lifting the shorter leg 40 to release the barbs 42 from the wall of the brush cage holder, thus allowing the cage and clip to be removed from the holder.

The invention claimed is:

1. A commutator motor, including a stator, wound rotor, commutator, bearing bracket and at least two sets of brush gear, each brush gear comprises: a brush spring, and a brush cage fitted to a radial through hole in the bearing bracket for directing the brush towards the commutator; and a cage clip located between an outer wall of the brush cage and an inner wall of the radial through hole having a first set of barbs which engage and grip an outer wall of the through hole to prevent withdrawal of the clip from the through hole once inserted and a second set of barbs which engage and grip the outer wall of the brush cage to prevent withdrawal of the brush cage from the through hole.

2. The motor of claim 1, wherein the brush cage resiliently deforms the second set of barbs on insertion thereby ensuring good contact between the second set of barbs and the cage.

3. The motor of claim 2, wherein the resilient deformation results in a lateral pretension on the cage reducing the lateral play between the cage and the through hole.

4. The motor of claim 1, wherein the clip is U-shaped and straddles the wall of the through hole.

5. The motor of claim 4, wherein the clip has an outer limb bearing the first set of barbs and an inner limb bearing the second set of barbs.

6. The motor of claim 5, wherein the outer limb is shorter than the inner limb and has an outwardly curved distal end.

7. The motor of claim 5, wherein the first set of barbs is inwardly and rearwardly directed.

8. The motor of claim 5, wherein the second set of barbs is outwardly and forwardly directed.

9. The motor of claim 1, wherein at least some of the barbs are cut and raised projections.

10. The motor of claim 1, wherein the clip is of a resilient conducting material.

11. The motor of claim 10, wherein the material is stainless steel.

12. The motor of claim 1, wherein the bearing bracket is of a molded insulating material.

13. The motor of claim 1, wherein the bearing bracket is a U-shaped stamped metal part having an insulator of molding insulating material fitted to each leg, each insulator forming the through hole for receiving a respective brush cage.

14. A method of assembling the commutator motor of claim 1 having a stator, bearing bracket, a wound rotor and two sets of cage brush assemblies, the method including the steps of:

fitting the rotor to the stator and bearing bracket and fitting the brush assemblies to respective through holes in the bearing bracket, said fitting of the brush assemblies including the steps of:

providing a cage clip having a first set of barbs and a second set of barbs, inserting the cage clip into the through hole so as to engage the first set of barbs with a wall of the through hole and to avoid engaging the second set of barbs with the wall of the through hole, inserting a brush cage into the through hole so as to resiliently deform the second set of barbs on insertion and to engage the second set of barbs on movement of the cage in the opposite direction, inserting a brush into the cage, inserting a brush spring into the cage to urge the brush into contact with the commutator and capturing the spring to remain in resilient contact with the brush.

15. The method of claim 14, wherein the clip is U-shaped and is pressed into the through hole so as to straddle the wall and is pressed in until a base of the U contacts the wall.

16. The method of claim 14, wherein the cage is provided with an external stopper and the cage is pressed into the through hole until the stopper contacts the bearing bracket.

17. The method of claim 14, including the step of resiliently deforming the second set of barbs as the cage is inserted and using the resiliency of the clip to provide a lateral pretension on the brush cage to reduce lateral play of the cage within the through hole.

* * * * *